(12) United States Patent
Kapoor

(10) Patent No.: US 9,910,780 B2
(45) Date of Patent: Mar. 6, 2018

(54) PRE-LOADING PAGE TABLE CACHE LINES OF A VIRTUAL MACHINE

(71) Applicant: International Business Machines Corporation, Armonk, NY (US)

(72) Inventor: Shakti Kapoor, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 10 days.

(21) Appl. No.: 14/925,651

(22) Filed: Oct. 28, 2015

(65) Prior Publication Data

US 2017/0123986 A1 May 4, 2017

(51) Int. Cl.
*G06F 12/08* (2016.01)
*G06F 12/12* (2016.01)
*G06F 12/0862* (2016.01)
*G06F 12/123* (2016.01)

(52) U.S. Cl.
CPC ........ *G06F 12/0862* (2013.01); *G06F 12/123* (2013.01); *G06F 2212/1021* (2013.01); *G06F 2212/152* (2013.01); *G06F 2212/602* (2013.01); *G06F 2212/69* (2013.01)

(58) Field of Classification Search
CPC ............... G06F 12/0862; G06F 12/123; G06F 2212/1021; G06F 2212/152; G06F 2212/602; G06F 2212/69
See application file for complete search history.

(56) References Cited

U.S. PATENT DOCUMENTS

2014/0013058 A1 1/2014 Hooker et al.

OTHER PUBLICATIONS

IBM "List of IBM Patents or Patent Applications Treated As Related".
U.S. Appl. No. 14/986,901, entitled Pre-Loading Page Table Cache Lines of a Virtual Machine, filed Jan. 4, 2016.
Disclosed Anonymously, Method and System for Prefetching Addresses of Cache Lines when a Partition is Scheduled, ip.com: Prior Art Database, 3 pages, May 2, 2011, ip.com, Fairport, United States.

*Primary Examiner* — Yong Choe
(74) *Attorney, Agent, or Firm* — Patterson + Sheridan, LLP

(57) ABSTRACT

Embodiments herein pre-load memory translations used to perform virtual to physical memory translations in a computing system that switches between virtual machines (VMs). Before a processor switches from executing the current VM to the new VM, a hypervisor may retrieve previously saved memory translations for the new VM and load them into cache or main memory. Thus, when the new VM begins to execute, the corresponding memory translations are in cache rather than in storage. Thus, when these memory translations are needed to perform virtual to physical address translations, the processor does not have to wait to pull the memory translations for slow storage devices (e.g., a hard disk drive).

10 Claims, 4 Drawing Sheets

PRE-LOADING PAGE TABLE CACHE LINES OF A VIRTUAL MACHINE

BACKGROUND

The present invention relates to warming up a computing system when switching between virtual machines (VMs). More specifically, the present disclosure relates to pre-loading saved memory translations before executing a new VM.

Typically, processors include at least one memory management unit (MMU) for performing virtual to physical address translations. For example, the processor may assign blocks of virtual memory to different processes executing on the processor (e.g., operating systems or user applications). Each of the virtual addresses corresponds to a physical memory address in memory. The mappings between the virtual and physical addresses are stored in a page table as page table entries. The page table is typically stored in main memory.

When a process sends a request to a processing core to read data from, or write data to, a particular virtual address, the MMU queries the page table (or a translation lookaside buffer) to identify the corresponding physical address. The processing core then uses the physical address to perform the read or write requested by the process.

SUMMARY

Another embodiment of the present invention is a computing system that includes a processor configured to execute a first OS corresponding to a first VM for a first time period and hypervisor. The hypervisor is configured to pre-load, before the first time period expires, page table entries corresponding to a second OS of a second VM by moving the page table entries from a lower level to an upper level of a memory hierarchy, where the upper level is closer to the processor in the memory hierarchy than the lower level. The hypervisor also instructs, after the first time period expires, the processor to begin executing the second OS corresponding to the second VM for a second time period.

Another embodiment of the present invention is a computer program product for switching between VM, the computer program product include computer code executable to instruct a processor to execute a first OS corresponding to a first VM for a first time period and pre-load, before the first time period expires, page table entries corresponding to a second OS of a second VM by moving the page table entries from a lower level to an upper level of a memory hierarchy, wherein the upper level is closer to the processor in the memory hierarchy than the lower level. After the first time period expires, the computer code is executable to instruct the processor to execute the second OS corresponding to the second VM using the processor for a second time period.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
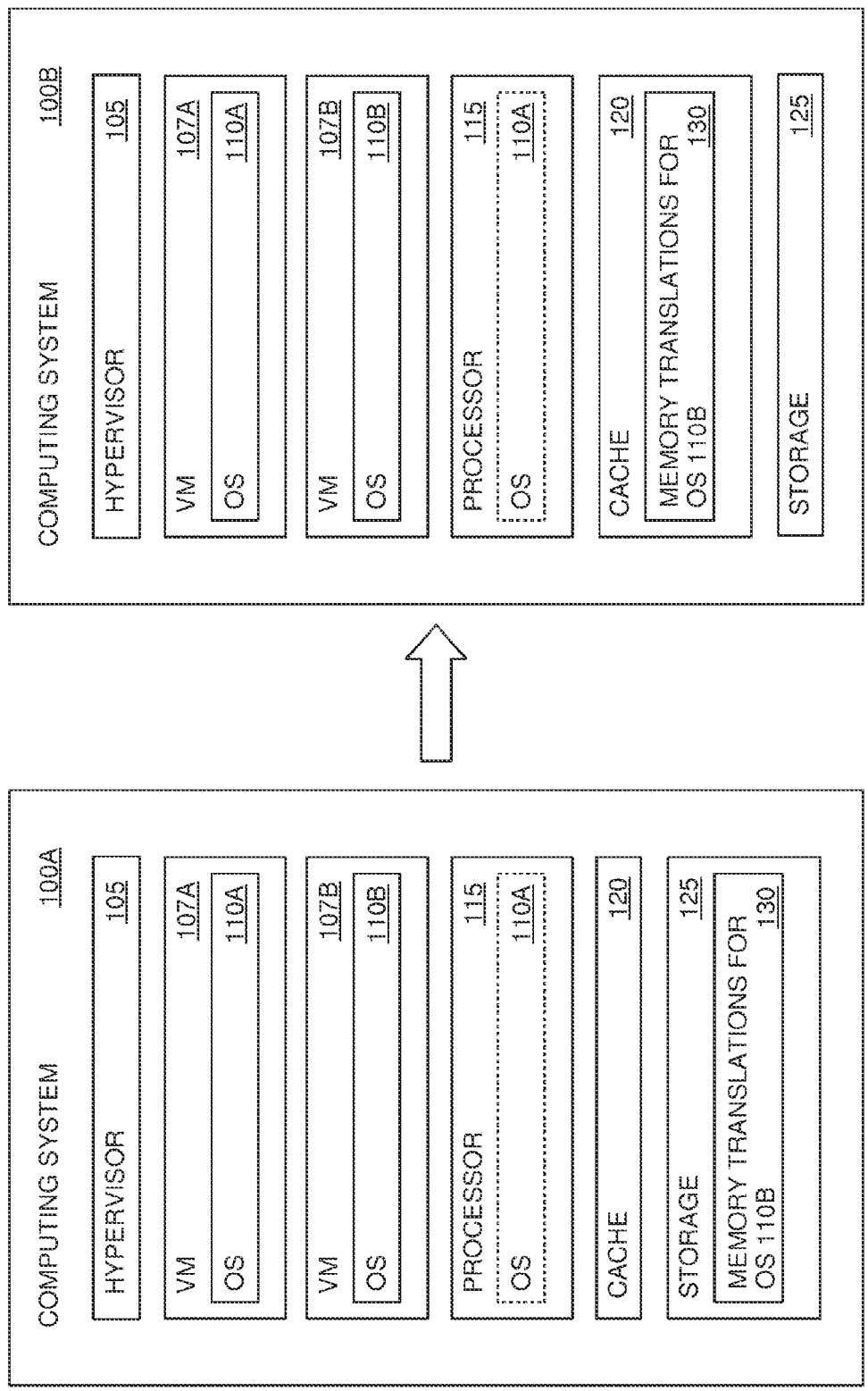
FIG. 1 is a block diagram of a computing system that pre-loads memory translations when switching virtual machines, according to one embodiment described herein.

Embodiments herein pre-load memory translations used to perform virtual to physical memory translations (or vice versa) in a computing system that switches between virtual machines (VMs). For example, a processor (or CPU) in the computing system may execute different VMs at different times. Put differently, the processing time of the processor may be allocated or divided amongst multiple VMs. In one embodiment, the processor executes instructions for a first VM during a first period of time and then switches to execute instructions for a second VM during a second period of time.

In some situations, the VMs are unrelated. More specifically, the memory translations used by processes executing in the first VM may be different than the memory translations used by the processes executing in the second VM. For example, the first and second VMs may execute different processes which are assigned different virtual memory addresses. In this case, the page table entries needed to perform the virtual to physical address translations for the processes executing in the first VM are different than the page table entries needed to perform address translations for the processes executing in the second VM. When the processor switches between the VMs, the page table entries cached when executing the previous VM are replaced in the cache by the page table entries corresponding to the new VM. However, doing so may require accessing slower storage devices (e.g., a hard disk) which slows down the execution of the new VM.

Embodiments herein pre-load the memory translations for the new VM to be executed. Stated differently, before the processor switches from the current VM to the new VM, a hypervisor may retrieve previously saved memory translations for the new VM and load them into cache or main memory. Thus, when the new VM begins to execute, the corresponding memory translations are in cache rather than in storage. When these memory translations are needed to perform virtual to physical address translations, the computing system does not have to retrieve the memory translations from slow storage devices (e.g., hard disk drives) which can save hundreds of thousands of processor cycles.

In one embodiment, the computing system includes a translation lookaside buffer (TLB) for performing virtual to physical memory translations. The TLB is a cache used by a MMU to store a subset of the page table entries. If an address is not in the TLB (i.e., a TLB miss), the computing system performs a page walk to find the address in another cache or main memory. Because the embodiments herein pre-load the previously saved memory translation into the cache, when there is a TLB miss, the desired address may be saved in the cache. As explained above, this saves the time required to retrieve the address information from storage. Put differently, when switching between VMs, the memory translations already stored in the TLB are likely to not be very useful to the new VM, and thus, the embodiments herein pre-load memory translations corresponding to the new VM into a cache or main memory. Instead of having to retrieve the page table entries from storage after a TLB miss, this data may be found in the cache. In this manner, pre-loading the memory translations into the cache "warms up" the TLB for the new VM since TLB misses may take less time to resolve.

FIG. 1 is a block diagram of a computing system 100 that pre-loads memory translations when switching VMs, according to one embodiment described herein. Specifically, the leftmost computing system 100A illustrates the state of the computing system before the memory translations are pre-loaded into a cache 120, while the rightmost computing system 100B illustrate the state of the computing system after the memory translations are pre-loaded into the cache 120.

The computing system 100 includes a hypervisor 105, VM 107A, VM 107B, processor 115, cache 120, and storage 125. The hypervisor 105 (i.e., a virtual machine monitor) is software and/or hardware that manages and executes the VMs 107 (also referred to as a logical partitions or LPARs) in the computing system 100. Generally, the hypervisor 105 is an intermediary between the VMs 107 and the hardware in the computing system 100—e.g., the processor 115. As shown, OS 110A is the operating system for VM 107A, while OS 110B is the operating system for VM 107B.

In one embodiment, the hypervisor 105 controls which VM 107 (and its corresponding OS 110) is currently being executed by the processor 115. Put differently, the hypervisor 105 can schedule the processing time of the processor 115 such that different blocks of processing time are assigned to different VMs 107 in the computing system 100. In this example, VM 107A is currently scheduled to use the processor 115. As such, the processor 115 executes instructions provided by the processes operating in OS 110A as indicated by the dotted box in processor 115. Although FIG. 1 illustrates just two VMs 107, the computing system 100 may include any number of VMs that split processing time on the processor 115.

The processor 115 represents any number of processing elements that each may include one or more processing cores. If the processor 115 includes multiple cores, in one embodiment, the VMs 107 may be scheduled to use the individual cores at different blocks of time. For example, the OS 110A of VM 107A may be scheduled to use a first core in processor 115, while OS 110B of VM 107B is scheduled to use a second core in processor 115. Alternatively, the VMs 107 may use the entire processor 115 (which includes multiple cores) during their scheduled time period. For example, all the cores in processor 115 may be performing instructions issued by OS 110A. While VM 107A is scheduled to use processor 115, the OS 110B of VM 107B may be idle—i.e., the hypervisor 105 stalls the processes running on OS 110B until its scheduled time to use the processor 115.

The cache 120 may be any memory element that is between the processor 115 and storage 125. The cache 120 and storage 125 form part of a memory hierarchy for computing system 100A. In one embodiment, the cache 120 stores a sub-portion of the data stored in storage 125. When performing a read or write request, the processor 115 may first search for the data in the cache 120 before searching for the data in storage 125. Although the cache 120 is typically smaller than the storage 125, the memory elements forming cache 120 may be faster to access. For example, the cache 120 may be made from RAM or flash memory while storage 125 could be a hard disk drive, tape drive, external data storage server, cloud storage, or other non-volatile storage device.

In one embodiment, the cache 120 may be memory elements within the integrated circuit (IC) forming the processor 115—e.g., L1 cache, L2 cache, L3 cache, etc. In another embodiment, the cache 120 may be main memory (e.g., a random access memory (RAM) device that includes DRAM or SRAM) disposed on a motherboard in the computing system 100. Although not shown, the cache 120 may store a page table that includes page table entries corresponding to the processes executed by the OS 110A. The processor 115 may use these page table entries to map virtual addresses to physical addresses (and vice versa).

In FIG. 1, the storage 125 includes memory translations 130 for OS 110B. That is, even though the processor 115 is currently executing OS 110A, the computing system 100 has previously stored memory translations 130 that correspond to OS 110B. As described in more detail below, the computing system 100 may have saved the memory translations 130 when processor 115 was previously executing OS 110B.

As shown in the rightmost computing system 100B, the hypervisor 105 moves the memory translations 130 for OS 110B into the cache 120. In one embodiment, the hypervisor 105 moves the memory translations 130 in response to determining the scheduled time for VM 107A to use the processor 115 is about to end and that VM 107B is next up to use the processor 115. Put differently, before the processor 115 switches from executing OS 110A to OS 110B, the hypervisor 105 begins to move the memory translations 130 closer in the memory hierarchy to processor 115. Because OS 110A and 110B may execute different processes which use different virtual address spaces, before the memory translation 130 are moved from storage into cache 120, the cache 120 may store only memory translation information for OS 110A. That is, during the time OS 110A executes on processor 115 any memory translations for OS 110B may have already been removed from cache 120.

In one embodiment, the computing system 100 may use a least recently used (LRU) policy to determine which memory translations to keep in cache 120 and which to invalidate—i.e., move to storage 125. Because the memory translations corresponding to the virtual addresses used by OS 110B are not used when the OS 110A is executing in processor 115, these memory translations are flagged by the hypervisor and removed from the cache 120. Thus, when the hypervisor 105 switches from executing OS 110A to executing OS 110B, the cache 120 may contain only memory translations for OS 110A. However, as shown in FIG. 1, the hypervisor 105 pre-loads selected memory translations 130 for OS 110B into the cache 120. Thus, when OS 110B begins to execute in processor 115, at least some memory translations 130 corresponding to OS 110B are in the cache 120, and thus, can be accessed more quickly than if the processor 115 had to wait until the memory translations were retrieved from storage 125. Thus, pre-loading the memory translations 130 may increase the throughput of the processor 115 when switching from executing OS 110A to OS 110B relative to a computing system that does not pre-load memory translations into the cache 120.

Figure 2:
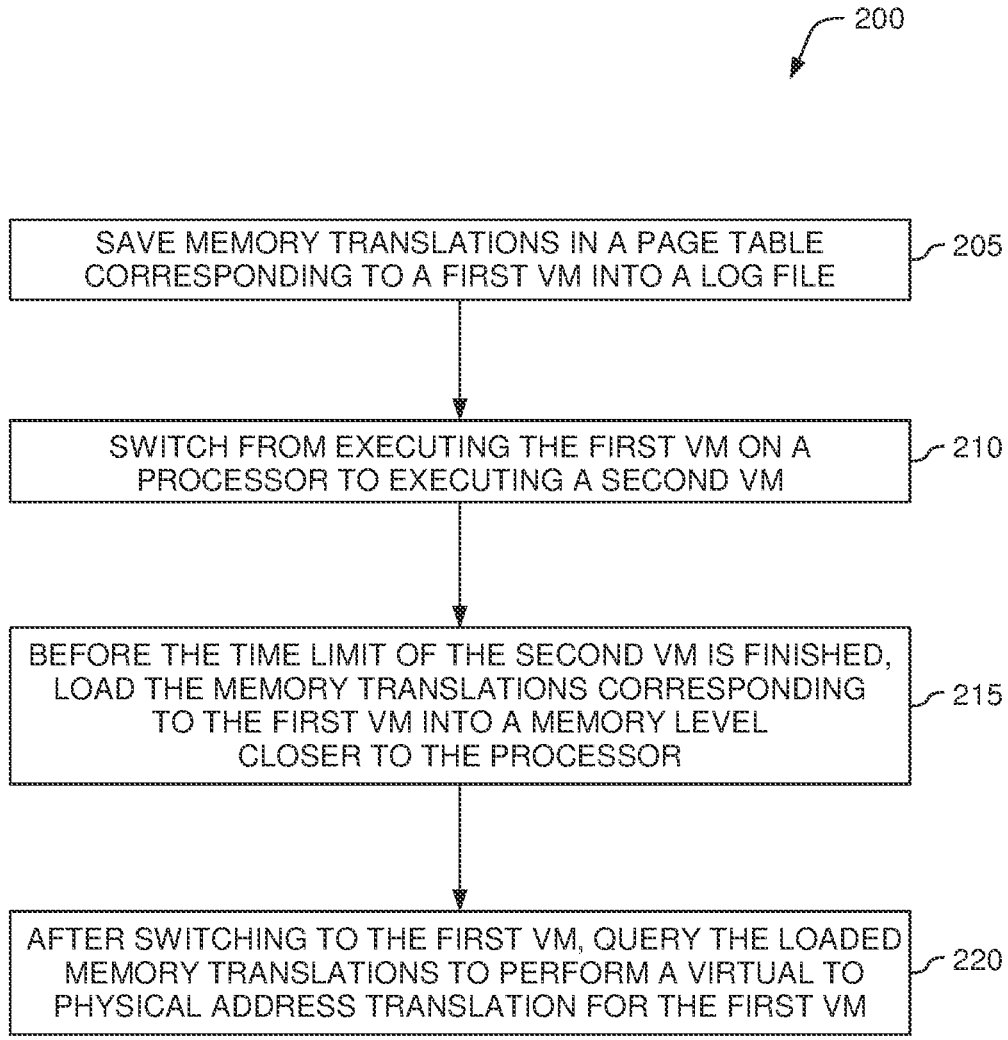
FIG. 2 is a flow chart for pre-loading memory translations when switching virtual machines, according to one embodiment described herein.

FIG. 2 is a flow chart of a method 200 for pre-loading memory translations when switching VMs, according to one embodiment described herein. For ease of explanation, the different blocks of method 200 are discussed in conjunction with FIGS. 3-6 which illustrate different examples corresponding to method 200. At block 205, the hypervisor saves memory translations in a page table corresponding to a first VM into a log file. In one embodiment, the hypervisor saves the memory translations during the time scheduled for the first VM to use the processor in the computing device. Assuming the first VM is given a predefined block of time to use the processor, once the hypervisor determines that the first VM only has, for example, 10% of its time remaining, the hypervisor begins to save memory translations associated with the OS for the first VM.

Figure 3:
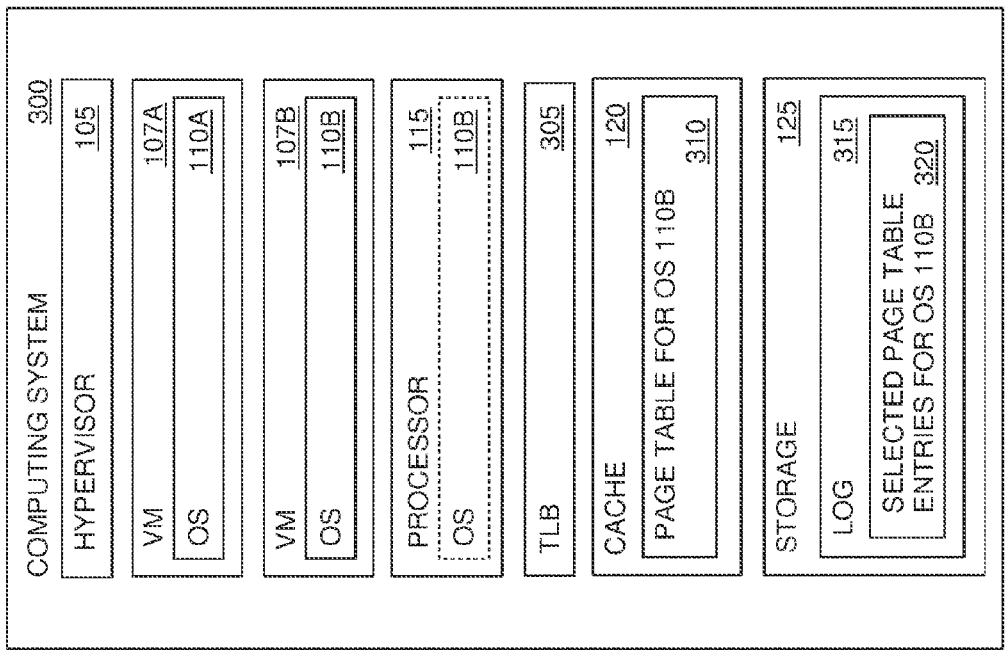
FIG. 3 is a block diagram of a computing system that stores memory translations when switching out a virtual machine, according to one embodiment described herein.

FIG. 3 is a block diagram of a computing system 300 that stores memory translations when switching out a VM, according to one embodiment described herein. As shown in this example, the processor 115 currently executes the OS 110B corresponding to VM 107B. Because the scheduled time for VM 107B is about to expire, the hypervisor 105 begins to save some of the entries 310 of a page table for OS 110B. Specifically, the hypervisor 105 saves one or more selected page table entries 320 for OS 110B into a log 315. Although log 315 is shown in storage 125, the log 315 may also be located in a cache that is further away from the processor 115 in the hierarchy than cache 120. For example, cache 120 may be a special cache used for storing page tables while the log 315 is stored in main memory. In one embodiment, the hypervisor 105 saves the selected page table entries 320 for the current OS being executed in a memory location that will not be overwritten when the next VM begins to execute on the processor 115.

The computing system 300 also includes a TLB 305 for performing the virtual to physical address translations requested by the processor 115. In one embodiment, the TLB 305 can be considered as a type of a cache that stores only a portion of the entries 310 in the page table for OS 110B. For example, the TLB 305 may be an associative memory (e.g., content addressable memory (CAM)) that is above the cache 120 in the memory hierarchy—i.e., the TLB 305 is closer to the processor 115 than the cache 120. As such, when performing a memory translation, the processor 115 first queries the TLB 305 to determine if the virtual to physical mapping is stored there. If not, the processor 115 then walks through the page table entries 310 in the cache 120. However, the cache 120 (e.g., main memory) may not have enough memory elements to store all the page tables that correspond to the entire virtual address space of computing system 300. For example, the cache 120, like the TLB 305, may store only a portion of the page table entries for the computing system 300. Accordingly, if the cache 120 does not have the desired mapping, the processor 115 may retrieve the virtual address from storage 125 which may contain copies of all the page tables in the computing system 300.

The hypervisor 105 may use a variety of techniques to determine which entries 310 of the page table should be stored in the log 315 before the time scheduled to VM 107B expires. In one embodiment, the hypervisor 105 selects the page table entries stored in the TLB 305 as the page table entries 320 stored in the log 315. That is, because in many computing systems the TLB 305 stores the page table entries that the computing system expects or predicts will most likely be needed in the future to perform memory translations, the hypervisor 105 may store the page table entries of the TLB 305 into the log 315. Thus, when VM 107B is again scheduled to use processor 115, this list of entries is preserved in the log 315.

In another embodiment, the hypervisor 105 identifies the page table entries that were most recently used (MRU) by the processor 115 when performing address translations to store in the log 315. For example, the hypervisor 105 may select only the page table entries that were accessed by the processor 115 to perform a memory translation in the last 50 milliseconds. Alternatively, the hypervisor 105 may maintain a count of each of the page table entries 310 indicating how many times each entry was used to perform a memory translation while the OS 110B was executing. The hypervisor 105 may select only the page table entries that have counts greater than a minimum count. In another example, the hypervisor 105 may limit the number of selected page table entries 320 to a fixed amount (e.g., only five megabytes) and select the entries with the highest counts until the fixed amount is met—i.e., select the first five megabytes of entries with the highest counts.

The examples provided above for selecting page table entries 320 for the currently executing OS are intended as non-limiting examples. A person of ordinary skill in the art will recognize there are many different techniques for selecting page table entries that are most likely to be accessed by the operating system when the corresponding VM is again scheduled to execute on the processor 115. Furthermore, in one embodiment, the hypervisor 105 may store all the entries 310 of the page table for OS 110B into the log 315 rather than selecting a sub-portion of the page table entries stored in the cache 120.

Although in FIG. 3 the selected page table entries 320 stored in the log 315 are identified before the scheduled time for VM 107B has expired, in another embodiment, the hypervisor 105 may select one or more page table entries 320 after the time has expired. For example, there may be some down time between when the processor 115 stops executing OS 110B and begins executing OS 110A. During this time, the hypervisor 105 can select which of the page table entries 320 to store in log 315. Moreover, the hypervisor 105 may select some or all of the page table entries 320 to store in the log 315 after the processor 115 begins executing OS 110A. Because it may take some time before the processor 115 replaces the page table entries currently in the TLB 305 and cache 120 with page table entries corresponding to OS 110A, the hypervisor 105 may have time to evaluate the entries in the TLB 305 and/or cache 120 to determine which entries to store in the log 315.

Returning to method 200, at block 210, the processor switches from executing the first VM to executing a second VM. As mentioned above, each VM in a computing system may be assigned a specific block of time to execute. Thus, for the block of time assigned to the VM, the processor executes instructions received for the OS corresponding to the VM while the other VMs are idle. That is, the processor does not execute instructions for the non-scheduled VMs.

Figure 4:
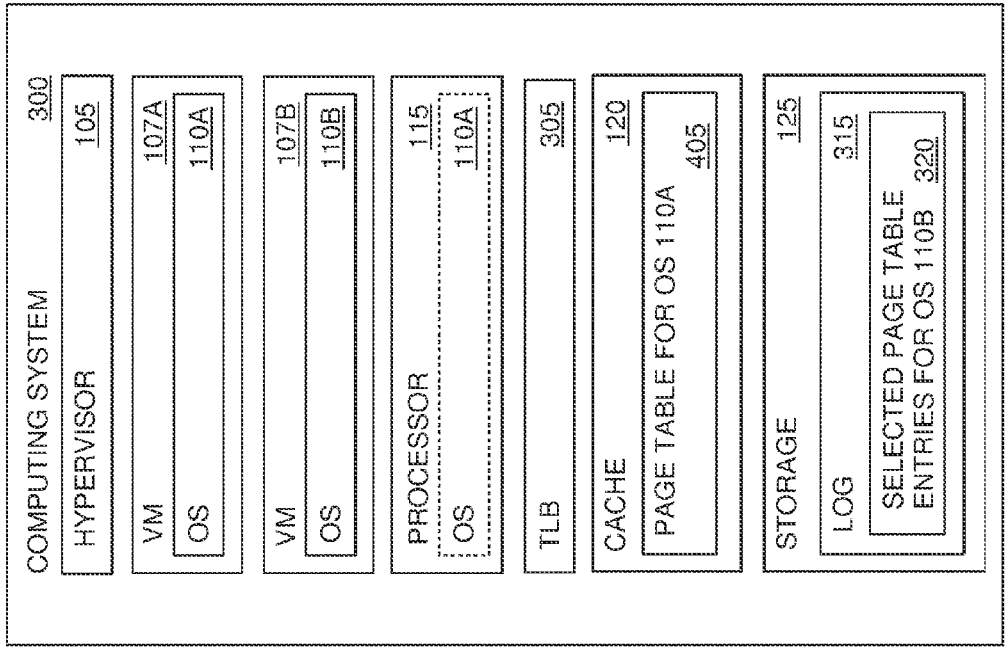
FIG. 4 is a block diagram of a computing system that switches between different virtual machines, according to one embodiment described herein.

FIG. 4 is a block diagram of a computing system 300 that has switched between VMs 107, according to one embodiment described herein. In contrast to FIG. 3, in computing system 300, the processor 115 now executes instructions received from OS 110A rather than OS 110B. Because the TLB 305 caches page table entries for OS 110B—i.e., the operating system previously executing on the processor 115—many if not all of the translation requests submitted by the processor 115 on behalf of OS 110A will result in cache misses. In response, the computing system 300 performs a page walk in the page table entries stored in cache 120— e.g., the main memory of computing system 300. However, the cache 120 may have limited storage capabilities—e.g., can store only a set amount of page table entries. In one embodiment, the computing system 300 may limit the amount of memory of cache 120 that can be used to store page table entries. For example, the cache 120 may be main memory where 2% of the cache 120 is reserved for page table entries while the other 98% is reserved for data requested by the OSs 110. As such, the computing system 300 may be unable to store the page table entries for all the different VMs 107 in the cache 120.

For example, in FIG. 3, the cache 120 may primarily store the page table entries 310 for OS 110B. As a result, many of the memory translation requests submitted by an MMU in the processor 115 will result in misses in cache 120. In response, the computing system 300 may retrieve the page table entries corresponding to OS 110A from storage 125 which may take hundreds of thousands of processor cycles.

FIG. 4 illustrates the result of the computing system 300 replacing the entries previously stored in cache 120 with the page table entries 405 for OS 110A. Although not shown, the entries in the TLB 305 may also be updated to include page table entries for OS 110A instead of OS 110B. Now, translation requests submitted by processor 115 are more likely to result in hits in either the TLB 305 or cache 120, thereby removing the need to query storage 125. This can increase the speed at which the processor 115 completes instructions since accessing page table entries stored in the TLB 305 and the cache 120 may require much fewer processing cycles than accessing data from storage 125.

Returning to method 200, at block 215, the hypervisor loads the memory translations corresponding to the first VM into a memory level closer to the processor before the time limit of the second VM is finished. That is, while the processor is still executing instructions for the OS corresponding to the second VM, the hypervisor begins loading memory translations corresponding to the OS of the first VM from a lower level to an upper level of the memory hierarchy—e.g., from storage into main memory.

Figure 5:
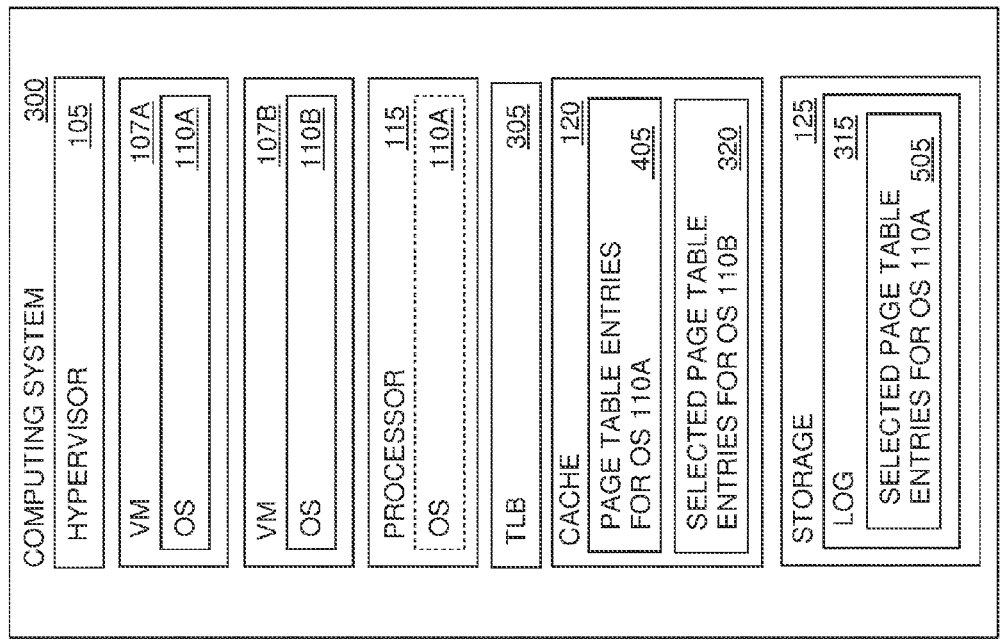
FIG. 5 is a block diagram of a computing system that pre-loads memory translations before switching virtual machines, according to one embodiment described herein.

FIG. 5 is a block diagram of a computing system that pre-loads memory translations before switching VMs, according to one embodiment described herein. In FIG. 5, the processor 115 still executes instructions received from OS 110A. However, the hypervisor 105 has moved the selected page table entries 310 for OS 110B from the log 315 in storage 125 into the cache 120. In one embodiment, the hypervisor 105 may begin to move the selected page table entries 320 into the cache 120 a predefined time before the VM 107A is switched out with VM 107B—e.g., one microsecond before the switch or when VM 107A has only 5% of its remaining time left. In one example, the hypervisor 105 may not be able to move all the entries 320 into the cache 120 before the processor 115 switches to executing OS 110B. Nonetheless, the hypervisor 105 at least starts to move the page table entries 320 for OS 110B into the cache 120 before processor 115 ceases executing instructions for OS 110A, even if the entries 320 are not finished being moved into cache 120 before OS 110B begins executing. Put differently, the hypervisor 105 begins the process of copying the page table entries 320 for OS 110B into the cache 120 before the processing time for VM 107A is over.

In one embodiment, the hypervisor 105 may finish moving the selected page table entries 320 into the cache 120 while the processor 115 is still executing OS 110A. Because the size of the cache 120 may be limited (or the number of entries in the cache reserved for page table entries may be fixed), the hypervisor 105 may selectively determine which of the page entries 405 for OS 110A to evict in order to free up memory locations for the page table entries 320 for OS 110B. In other words, the hypervisor 105 select which of the page table entries 405 for OS 110A to replace with the page table entries 320 for OS 110B.

In one embodiment, the hypervisor 105 may determine which of the page table entries 405 are least likely to be used by the processor 115 when executing the OS 110A for the remaining time assigned to VM 107A. By doing so, the hypervisor 105 will hopefully avoid evicting a page table entry 405 for OS 110A which then must be fetched from storage 125 thereby slowing down the execution of OS 110A. Put differently, the hypervisor 105 may predict which page table entries 405 are least likely to be used by the processor 115 when executing OS 110A and evict only those entries 405 from the page table in order to make room for the page table entries 320 for OS 110B.

In one embodiment, the hypervisor 105 uses a least recently used (LRU) algorithm to select the page table entries 405 to evict from the cache 120. When doing so, the hypervisor 105 selects the page table entries 405 that are used most infrequently by the processor 115 to perform memory translations and replaces those entries with the page table entries 320 for OS 110B. In another example, by monitoring historical data, the hypervisor 105 may identify which page table entries are typically accessed (and which are not) when the processor 115 stops executing OS 110A and evict only the entries which are not frequently used. For example, the processor 115 may perform the same maintenance operations when switching between VMs 107 which use the same page table entries. By identifying which of the page table entries 405 are used during the maintenance operations, the hypervisor 105 can keep these entries in the cache 120 while evicting the others. One of ordinary skill will recognize these examples are just a few of the different techniques for predicting which page table entries will (or will not) be used in the future which can be applied to the embodiments described herein.

Although FIG. 5 illustrates moving the page table entries 320 for OS 110B from storage 125 to cache 120, in another embodiment, the page table entries 320 may be moved into the TLB 305 before the hypervisor 105 switches from VM 107A to VM 107B. That is, hypervisor 105 may switch out one or more of the entries in the TLB 305 with one or more of the page table entries 320 for OS 110B. Although replacing all of the entries in the TLB 305 with the entries 320 for OS 110B may not be desired since doing so significantly increases the chances that the translation requests submitted while executing OS 110A result in a TLB miss, replacing some of the entries may reduce the likelihood of having to query the storage 125 for a page table entry when the processor 115 begins to execute OS 110B.

Furthermore, in one embodiment, once the processor 115 switches from executing OS 110A to OS 110B, the hypervisor 105 may evict the remaining page table entries 405 for OS 110A from the cache 120 and/or the TLB 305. For example, if the hypervisor 105 knows that page table entries for OS 110A are never or almost never used when executing OS 110B, the hypervisor 105 may proceed to evict the remaining entries in the cache 120 or the TLB 305 and replace them with the selected page table entries 320. In one embodiment, the hypervisor 105 may move the page table entries 320 saved into cache 120 while OS 110A was still executing on processor 115 into the TLB 305 once the processor 115 stops executing OS 110A and begins executing OS 110B.

While moving the page table entries 320 into cache 120, the computing system 300 selects page table entries 505 for OS 110A which are stored in cache 120 and/or TLB 305 and saves these entries into the log 315. That way, when switching back to VM 107A, the hypervisor 105 can move the entries 505 for OS 110 from the log 315 into the cache 120 or TLB 305 as discussed above. In one example, the hypervisor 105 may select which of the entries 505 for OS 110A to save into the log 315 in parallel with moving the selected page table entries 320 for OS 110B from the log 315 into an upper level of the memory hierarchy—i.e., cache 120 or TLB 305.

Returning to method 200, at block 220, the processor queries the loaded memory translations to perform a virtual to physical address translation for the first VM after switching to the first VM. Put differently, instead of having to wait until a TLB miss and a cache miss before moving page table entries corresponding to the first VM from storage, the computing system has already begun moving at least some of the page table entries for the first VM from storage into a level of memory closer to the processor—e.g., main memory or the TLB. In one embodiment, some of the page table entries for the first VM are already stored in the main memory or TLB, thereby increasing the chance that the computing system will not have to go to storage in order to satisfy memory translation requests submitted when executing instructions submitted by the OS for the first VM. Moving the page table entries for the first VM from storage into a higher level in the memory hierarchy is referred to herein as warming up the TLB. Even if the page table entries for the first VM are not actually moved into the TLB before the processor begins executing the OS of the first VM, doing so still warms up the TLB since when the processor does begin executing the OS, the embodiments herein improve the odds that a TLB miss will not require querying storage. Instead, at least some of the page table entries for the first VM may be located in a cache—e.g. main memory—which is much faster to access.

Figure 6:
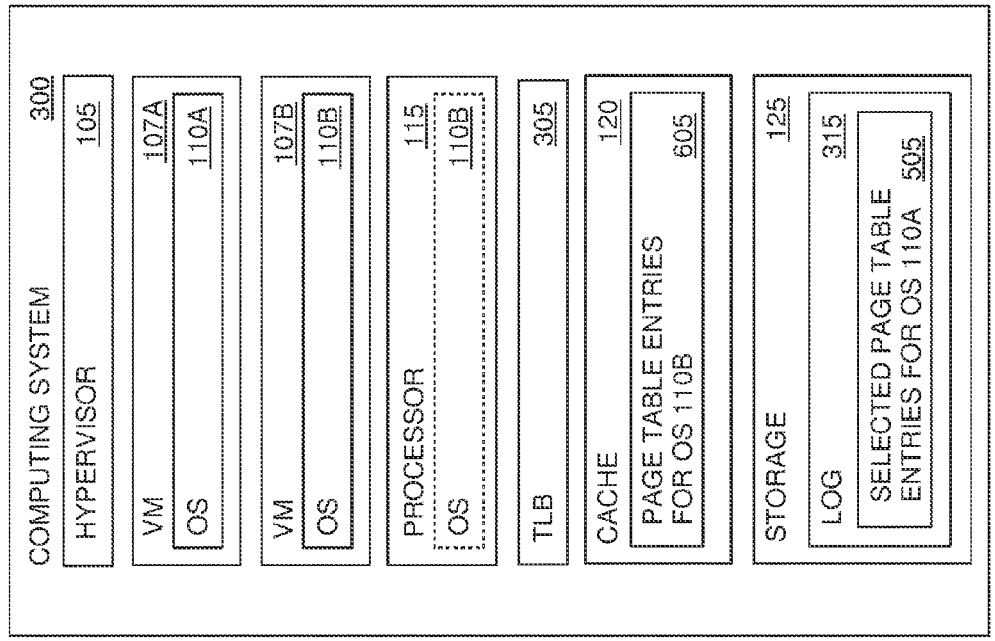
FIG. 6 is a block diagram of a computing system that switches between different virtual machines, according to one embodiment described herein.

FIG. 6 is a block diagram of a computing system 300 that switches between different VMs, according to one embodiment described herein. As shown, the processor 115 has switched from executing OS 110A (as shown in FIG. 5) to executing OS 110B. In this example, the page table entries for OS 110A have been evicted from the cache 120 and replaced by page table entries 605 for OS 110B. In one embodiment, after executing OS 110B for a sufficient amount of time, all the page table entries 405 for OS 110A in cache 120 may have been replaced by only page table entries 605 for OS 110B. Similarly, although not shown, the entries in the TLB 305 may have been replaced relative to the entries of the TLB 305 at the time represented by FIG. 5.

Although some of the page table entries 605 for OS 110B may have been pre-loaded into the cache 120 as shown in FIG. 5, the remaining portion of the entries 605 may be loaded after the processor 115 begins to execute OS 110B—i.e., when the computing system 300 switches from executing VM 107A to executing VM 107B. For example, the processing element 115 may submit a translation request that includes a virtual address that does not correspond to one of the pre-loaded page table entries. In this case, the computing system 300 retrieves the corresponding page table entry from storage 125. Thus, while some of the page table entries 605 may have been pre-loaded into the cache 120 (and/or TLB 305), the computing system 300 may retrieve other page table entries for OS 110B from memory after the processor 115 begins to execute OS 110B.

Once the processing time for VM 107B begins to close, method 200 may repeat. That is, before switching back to VM 107A, the hypervisor 105 may save the selected entries from the page table entries 605 into the log 315 as shown in FIG. 3. Moreover, the hypervisor 105 may begin to pre-load the selected page table entries 505 for OS 110A stored in the log 315 into the cache 120 in anticipation of switching from VM 107B to VM 107A. As mentioned above, the hypervisor 105 may evict some of the page table entries 605 for OS 110B in cache 120 to make room for the selected page table entries 505.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computing system, comprising:
a processor configured to execute a first operating system (OS) corresponding to a first virtual machine (VM) for a first predefined time period; and
a hypervisor configured to:
pre-load, before the first predefined time period expires, page table entries corresponding to a second OS of a second VM by moving the page table entries from a lower level to an upper level of a memory hierarchy, wherein the upper level is closer to the processor in the memory hierarchy than the lower level, and
instruct, after the first time predefined period expires, the processor to begin executing the second OS corresponding to the second VM for a second predefined time period.

2. The computing system of claim 1, wherein, when executing the first OS during the first predefined time period, the second OS is idle, and when executing the second OS during the second predefined time period, the first OS is idle.

3. The computing system of claim 1, wherein the hypervisor is configured to, when moving the page table entries from the lower level to the upper level, move the page table entries from a log file in a storage device to a random access memory (RAM) device.

4. The computing system of claim 1, wherein the hypervisor is configured to:
instruct, before the first and second predefined time periods, the processor to execute the second OS during a third time period; and
selecting, before the first predefined time period, one or more page table entries corresponding to the second OS to save in the lower level of the memory hierarchy.

5. The computing system of claim 4, wherein selecting the one or more page table entries corresponding to the second OS comprises:
determining the one or more page table entries that were most recently used (MRU) to perform a memory address translation when executing the second OS on the processor during the third time period.

6. The computing system of claim 4, wherein the hypervisor is configured to:
save the selected one or more page table entries to a non-volatile storage device before beginning to execute the first OS during the first predefined time period.

7. A computer program product for switching between virtual machines (VM), the computer program product comprising:
a non-transitory computer-readable storage medium having computer-readable program code embodied therewith, the computer-readable program code executable by one or more computer processors to:
instruct a processor to execute a first operating system (OS) corresponding to a first VM for a first predefined time period;
pre-load, before the first predefined time period expires, page table entries corresponding to a second OS of a second VM by moving the page table entries from a lower level to an upper level of a memory hierarchy, wherein the upper level is closer to the processor in the memory hierarchy than the lower level; and
after the first predefined time period expires, instruct the processor to execute the second OS corresponding to the second VM using the processor for a second predefined time period.

8. The computer program product of claim 7, wherein, when executing the first OS during the first predefined time period, the second OS is idle, and when executing the second OS during the second predefined time period, the first OS is idle.

9. The computer program product of claim 7, wherein the computer-readable program code is further executable to:
instruct, before the first and second predefined time periods, the processor to execute the second OS during a third time period; and
select, before the first predefined time period, one or more page table entries corresponding to the second OS to save in the lower level of the memory hierarchy.

10. The computer program product of claim 7, wherein pre-loading the page table entries corresponding to the second OS corresponding to the second VM comprises:
selecting, before moving the page table entries from the lower level to the upper level, one or more page table entries in the upper level corresponding to the first OS using a least recently used (LRU) algorithm; and
evicting, before moving the page table entries from the lower level to the upper level, the selected one or more page table entries corresponding to the first OS from the upper level of the memory hierarchy.

* * * * *